United States Patent [19]
Flowerdew et al.

[11] Patent Number: 5,260,659
[45] Date of Patent: Nov. 9, 1993

[54] METHOD AND APPARATUS FOR TRACING CONDUCTORS USING AN ALTERNATING SIGNAL HAVING TWO COMPONENTS RELATED IN FREQUENCY AND PHASE

[75] Inventors: Peter M. Flowerdew, Bristol; Andrezej Z. Regini, Eastington, both of England

[73] Assignee: Radiodetection Limited, Bristol, England

[21] Appl. No.: 635,603

[22] PCT Filed: Feb. 12, 1990

[86] PCT No.: PCT/GB90/00212
§ 371 Date: Apr. 1, 1991
§ 102(e) Date: Apr. 1, 1991

[87] PCT Pub. No.: WO90/09601
PCT Pub. Date: Aug. 23, 1990

[30] Foreign Application Priority Data
Feb. 13, 1989 [GB] United Kingdom ............ 8903218
Nov. 9, 1989 [GB] United Kingdom ............ 8925357

[51] Int. Cl.$^5$ .............. G01V 3/08; G01V 3/10; G01R 19/00
[52] U.S. Cl. .............. 324/326; 324/66
[58] Field of Search .............. 324/66, 67, 326, 233; 379/26

[56] References Cited
U.S. PATENT DOCUMENTS
3,628,138 12/1971 Collier et al. ............ 324/66
4,686,454 8/1987 Pecukonis ............ 324/67
4,896,117 1/1990 Flowerdew et al. ............ 324/326

Primary Examiner—Walter E. Snow
Attorney, Agent, or Firm—Flehr, Hohbach, Test, Albritton & Herbert

[57] ABSTRACT

A system for tracing routes of conductors is disclosed. An alternating signal is applied to the object to be traced (12), and the field produced by this signal is detected remotely from the object. In order to distinguish between signals produced by the object being traced and those produced by nearby conductors (14) due to capacitive coupling, the alternating signal has first and second components, related in frequency and phase, and the field is detected at a plurality of positions. The phase relationship of the detected signals is investigated to determine unambiguously the position of the object concerned. In one embodiment, the second frequency component is a harmonic of the other. In another embodiment the frequency of the second component is the frequency of the first, plus or minus a sub-harmonic of the first.

10 Claims, 9 Drawing Sheets

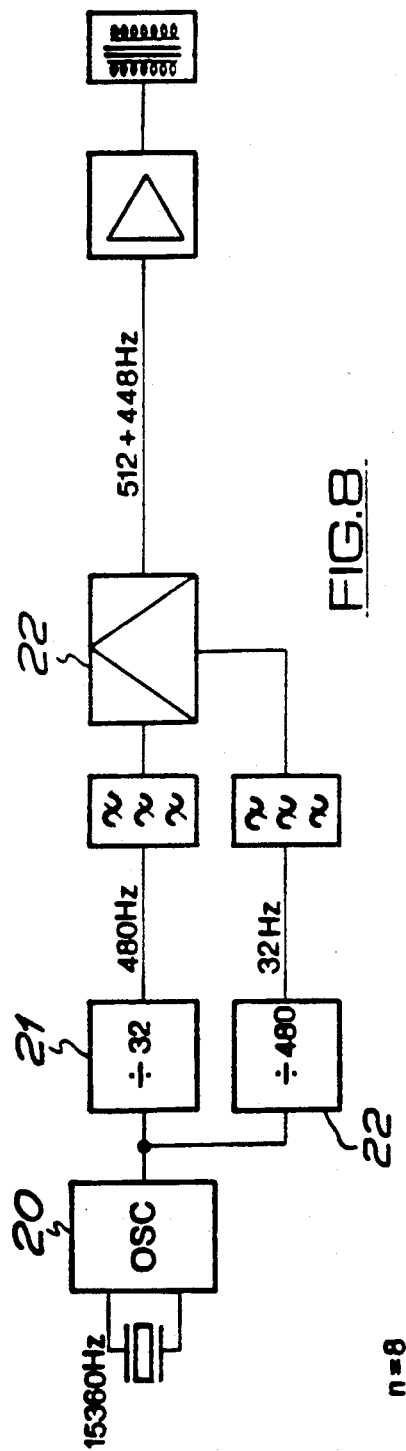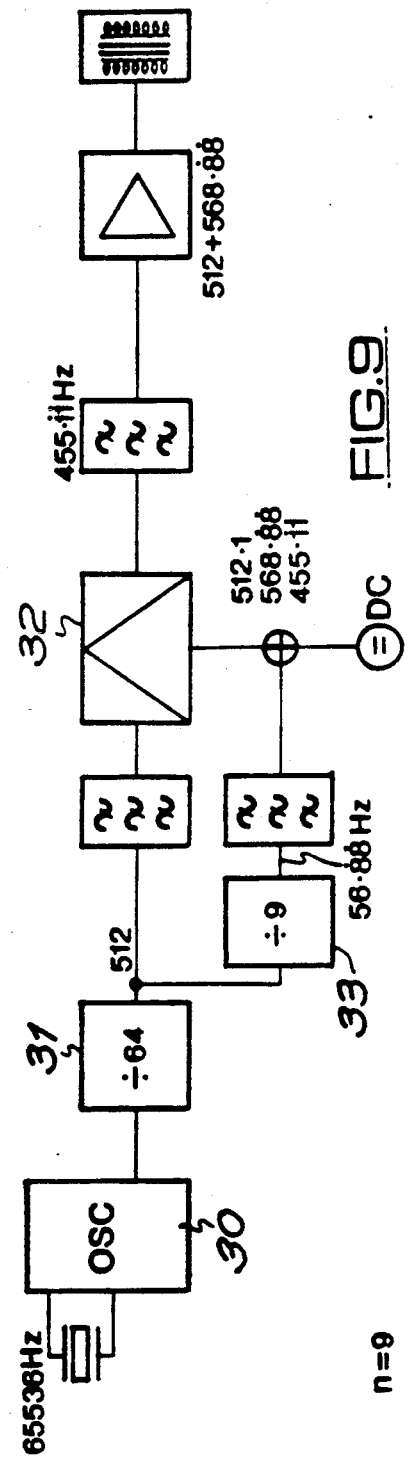

METHOD AND APPARATUS FOR TRACING CONDUCTORS USING AN ALTERNATING SIGNAL HAVING TWO COMPONENTS RELATED IN FREQUENCY AND PHASE

BACKGROUND OF THE INVENTION

1. Field of the Invention

The present invention relates to a method of tracing a conductor e.g. the route of pipes and cables; and to an apparatus therefor. By cable we include electric cables, optical fibre cables (where the conductive armouring provides a conductive path). Indeed the invention is applicable to any metallic pipe or duct. It is now well-known to induce a signal into a metallic conductor, and to detect the propagation of that signal at a remote point, to detect the conductor's position or faults in the conductor. This technique is particularly, but not exclusively, applicable where the conductor (such as an electric cable) is inaccessible, or hidden e.g. underground.

2. Summary of the Prior Art

Many techniques have been developed for analysing the signals which propagate down the conductor, and various techniques have been established for remotely detecting those signals. In general, the field produced by the alternating current on the service may be sampled using an aerial placed in the vicinity of the conductor; the relative magnitude of the detected signal at various points conveys information about the conductor's position. One particular configuration uses one or more horizontal coils so that the detected signal is a maximum when the coil is directly above and orthogonal to the conductor. The phase of this signal with respect of the transmitted signal will be constant at a point, the value determined by the electrical properties of the circuit.

However, much of the theory of such detection has been determined on the basis that there is a single conductor. In practice, such conductors are usually in groups. The problem then is that, although it is possible to ensure that the transmitter induces current only into one conductor, nevertheless there is likely to be capacitative coupling or even direct bonding between the conductors along their length, and therefore currents will also be generated in the other conductors. At first sight, these other currents should be of much lower amplitude, but in fact the detected signal, derived from the magnetic flux seen by the receiving aerial may not differ significantly between one conductor and another. Bearing in mind that the detection of the signal may have to be from a point remote from the conductor, the distance between the detector and the conductor may therefore be a significant factor in the magnitude of the signal detected. For example, if the conductor to which the current is actually applied is somewhat further away from the detector than another conductor to which current has capacitively been transmitted, then the signal from the latter conductor may be of comparable magnitude with that in the conductor to which the current has been applied. As a result, it is impossible to tell the two apart, and thus the measurement is ineffective.

SUMMARY OF THE INVENTION

The present invention seeks to solve this problem by applying a signal current for transmission which comprises at least two components related in frequency and phase. The frequency relation may be one based on a direct harmonic, with one component being an integer (normally an even integer) multiple of the other. Alternatively, one component may be produced by combining a sub-harmonic of the frequency of the other with that frequency.

When the signal is capacitively transmitted to another conductor, the phase relationship of the two signals is reversed. Therefore, by comparing the phase of the signal determined at one point with the phase of the signal at another point, it becomes possible to determine the conductor to which the signal had actually been applied. One of the points at which the signal is determined may be the point of transmission, so that an absolute value is used. Alternatively it is possible to measure at one point along the cable or pipe, and then measure again at a further point, with the first measurement as a reference, the difference in phase between that first point and the second point can be investigated, i.e. it is a relative measurement. The advantage of this is that comparison of the detected signal with the transmitted signal depends on there being negligible phase shift of the signal along the cable. However, particularly at high frequencies, this phase shift may not be negligible due to the resistance and capacitance effects of the pipe or cable, and therefore a relative system must be used.

To investigate the phase relationship, several different analysis methods may be used. Where one of the components is a direct harmonic of the other, that other may be multiplied by the harmonic number, and the two compared. Alternatively, applicable both for direct harmonics and for components being the frequency plus or minus a sub-harmonic, the two components may be multiplied together. Where the number of the sub-harmonic is odd, a direct multiple can be used. Where the number of the harmonic or sub-harmonic is even, it is necessary to multiply the product of the components by an integer which may be any odd integer or the number of the harmonic or sub-harmonic.

BRIEF DESCRIPTION OF THE DRAWINGS

Embodiments of the present invention will now be described in detail, by way of example, with reference to the accompanying drawings, in which:

FIGS. 8 and 9 are block diagrams of transmitter for arrangements involving even and odd sub-harmonics respectively.

DETAILED DESCRIPTION

Figure 1:
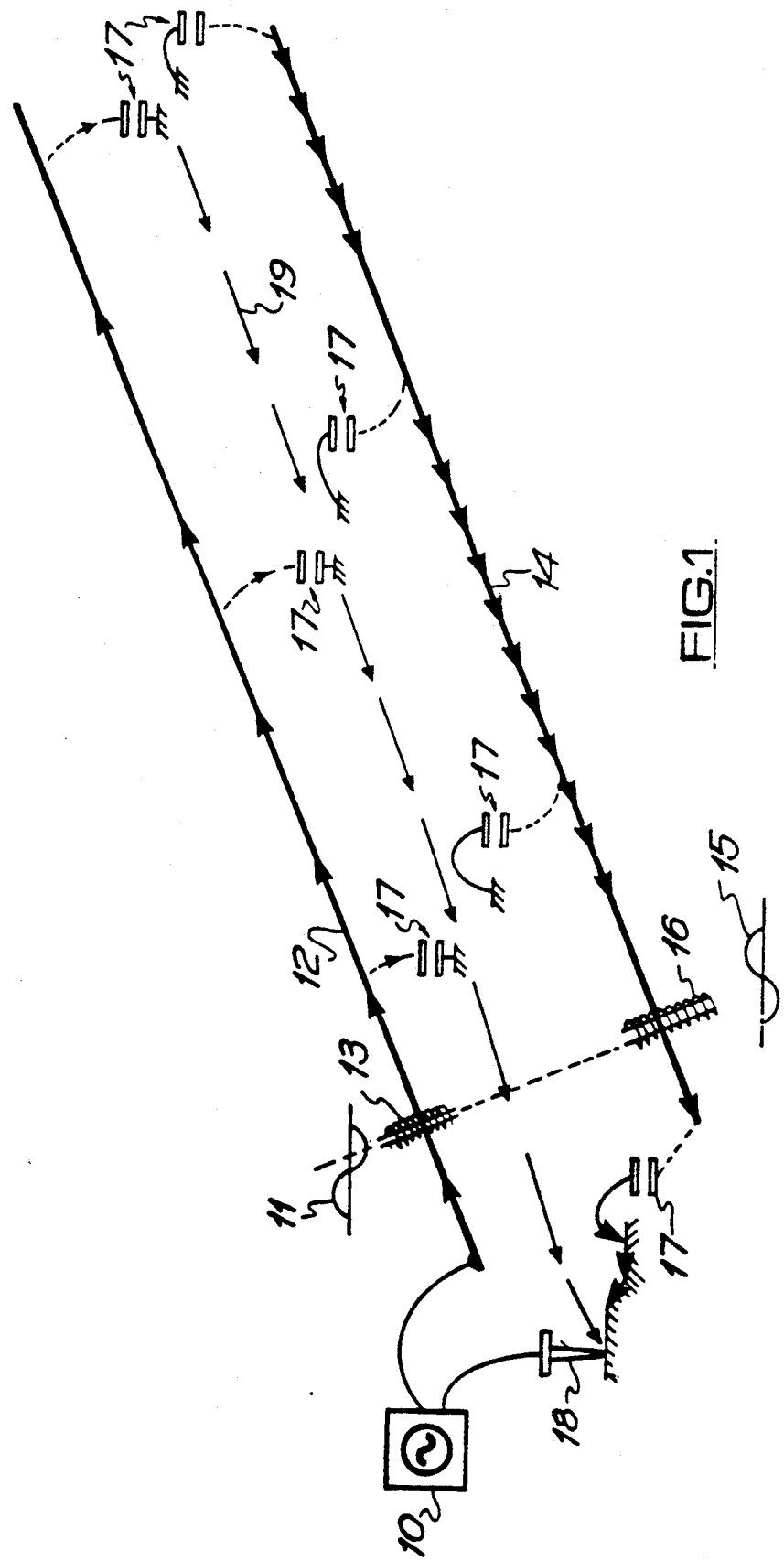
FIG. 1 shows a general schematic view of a cable system.

Referring to FIG. 1, a transmitter 10 applies a waveform 11 to a conductor 12. Although illustrated as a single sine wave, the waveform of the first embodiment of the present invention corresponds to a plurality of waveform harmonics in a predetermined phase. Indeed, at its simplest, it may be treated as a waveform and the first harmonic of that waveform. The signal is propagated down the conductor 12 and may be detected by a suitable detector (aerial) 13. That detector 13 may operate on standard principles known of detection of signals applied to inaccessible conductors.

However, as described above, the line 12 may be capacitively coupled to another conductor e.g. line 14, and the signal 11 will be transmitted to that line 14. The capacitive couplings are shown at 17. However, as illustrated at 15, the phase is reversed and this means that the signal detected by a detector 16 detecting the signal on line 14 is different from that detected by detector 13. Thus, with a knowledge of the signal phase it becomes possible to tell the line to which the transmitter 10 applies the signal, irrespective of capacitative coupling.

FIG. 1 also shows that the transmitter 10 is connected to an earth stake 18 to provide electrical grounding, and this has the effect of providing a return path indicated by arrows 19 for signals passing via the capacitive couplings 17.

In a preferred arrangement of the method of this first embodiment two signals, both phase and frequency locked, are applied simultaneously, one being an even integer multiple of the other. At the receiver, multiplying the lower frequency by the even integer signal produces two signals of the same frequency. The signal produced by frequency multiplying will have a fixed phase shift with respect to the transmitter, over both lines, whereas the higher frequency signal will have a phase shift which changes by 180° as the detector is moved from one line to the other.

Figure 2:
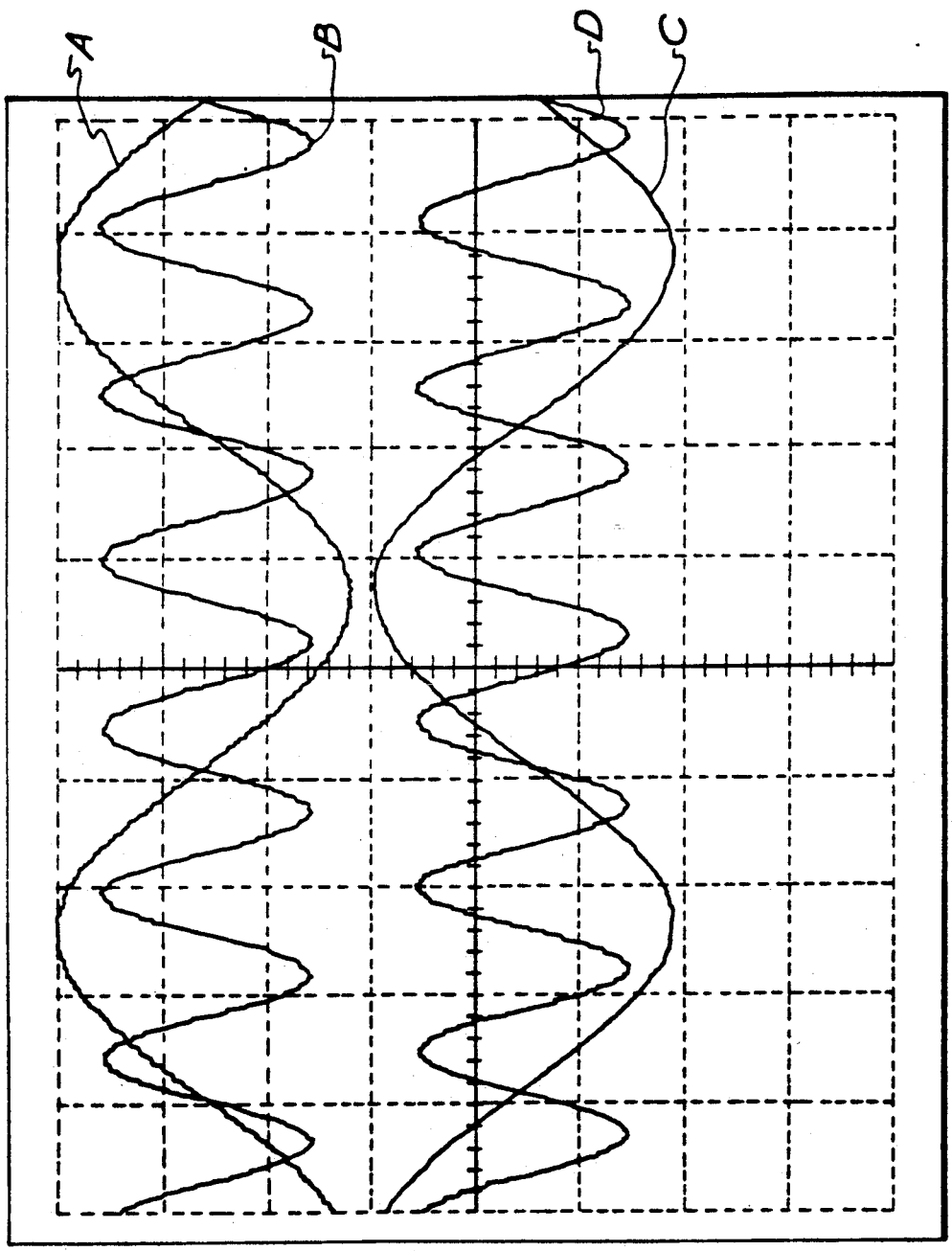
FIGS. 2 and 3 show signals on the cables.

Because the signal being received has a 180° phase shift imposed on it, even integer multiples of the frequency of that signal appear to remain at the same phase, as is shown in FIG. 2 for the specific case of the signal being multiplied by 4.

Thus FIG. 2 shows a first curve A being a first signal generated by the transmitter 10 at a first frequency and a second curve B being a second signal generated by the transmitted 10 at a second frequency four times the first, which signals are applied to a first conductor (e.g. line 12). If the fields are detected at a second conductor (e.g. line 14) to which the first is capacitively coupled, the fields from those two signal each change in plane by 180°. However if the lower frequency field signal (curve C in FIG. 2) is then multiplied by 4 (curve D in FIG. 2) then it is in phase with the second signal corresponding to curve B. Thus after multiplication, one is in phase and one out of phase. Where the signals are detected on the same conductor to which these are applied, they must remain in phase. Therefore it is possible to determine unambiguously if the field being detected is in the conductor to which the signals are applied or in another conductor.

When the signal received by the detector 13 is frequency multiplied using electronic means then any change in phase will also be multiplied by the same multiple. So in a practical embodiment the minimum multiplying of factor of two is preferred.

By this means the phase of the two signals at the receiver may be compared to identify the conductor to which the current was applied and the one carrying the ground return current. This is shown in FIG. 3, for the specific case of signals being at frequency four times apart.

Figure 3:
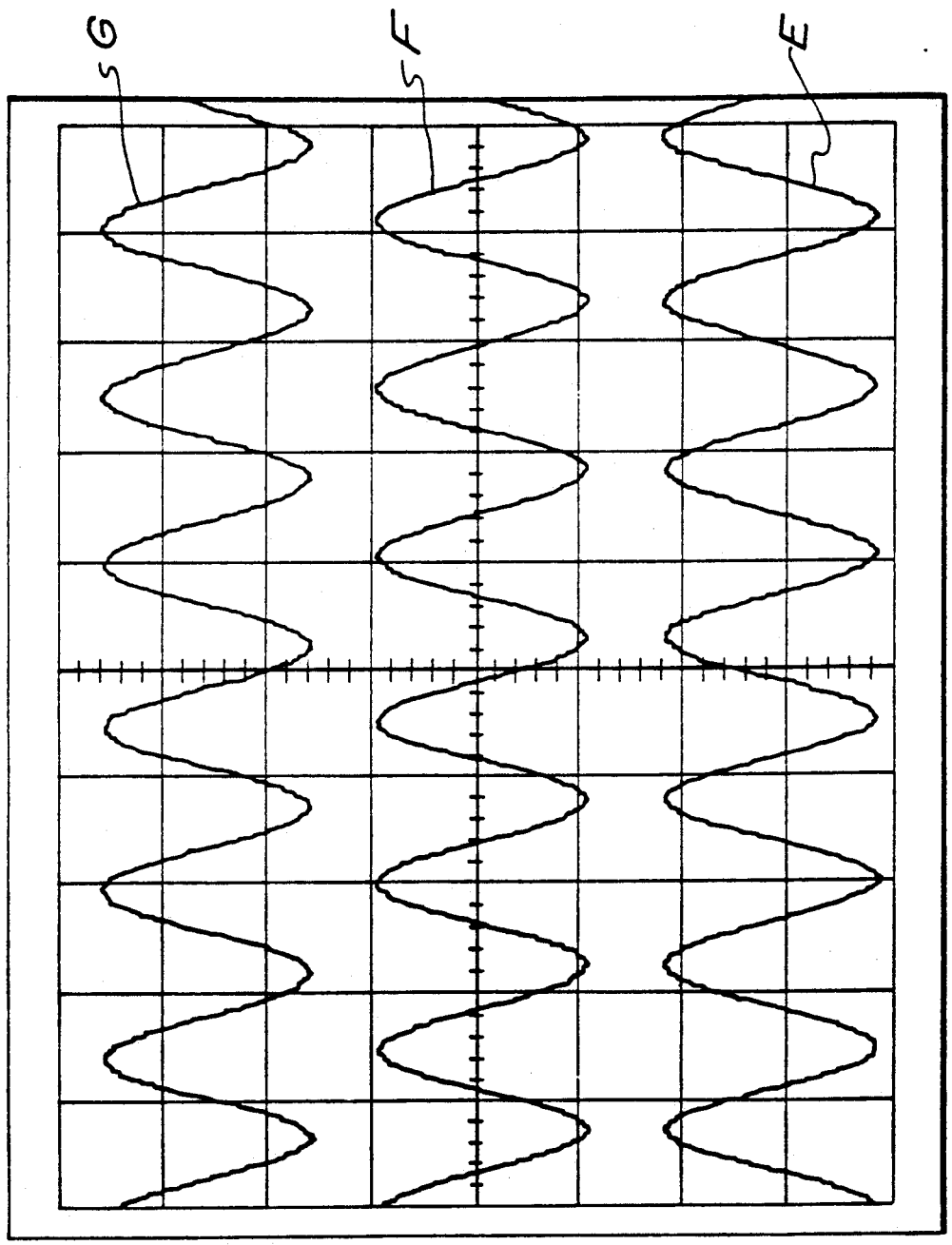

In FIG. 3 curve E corresponds to the high frequency signal applied by the generator 10, and also to the high frequency detected signal, if the detection is on the conductor to which the signal is applied. The high frequency signal on another conductor is shown at curve F, which is 180° out of place with curve E. The multiple (by 4) of the low frequency signal is the same for both a conductor to which the signal is applied and one which is capacitively coupled thereto (curve G). Thus there is a different phase relationship between curves E and G and curves F and G.

Figure 4:
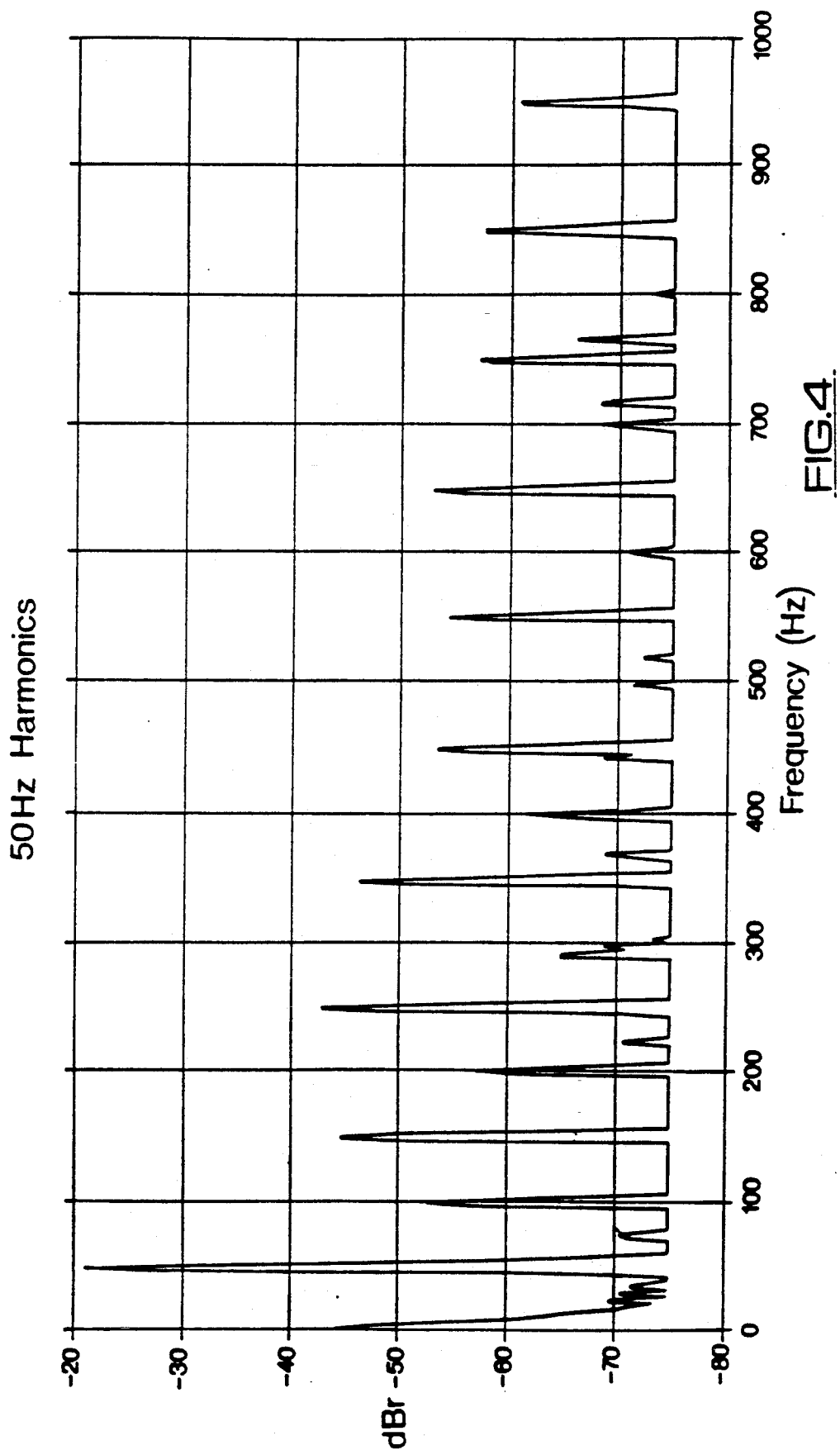
FIGS. 4 and 5 show harmonics radiating from a cable carrying mains power.
Figure 5:
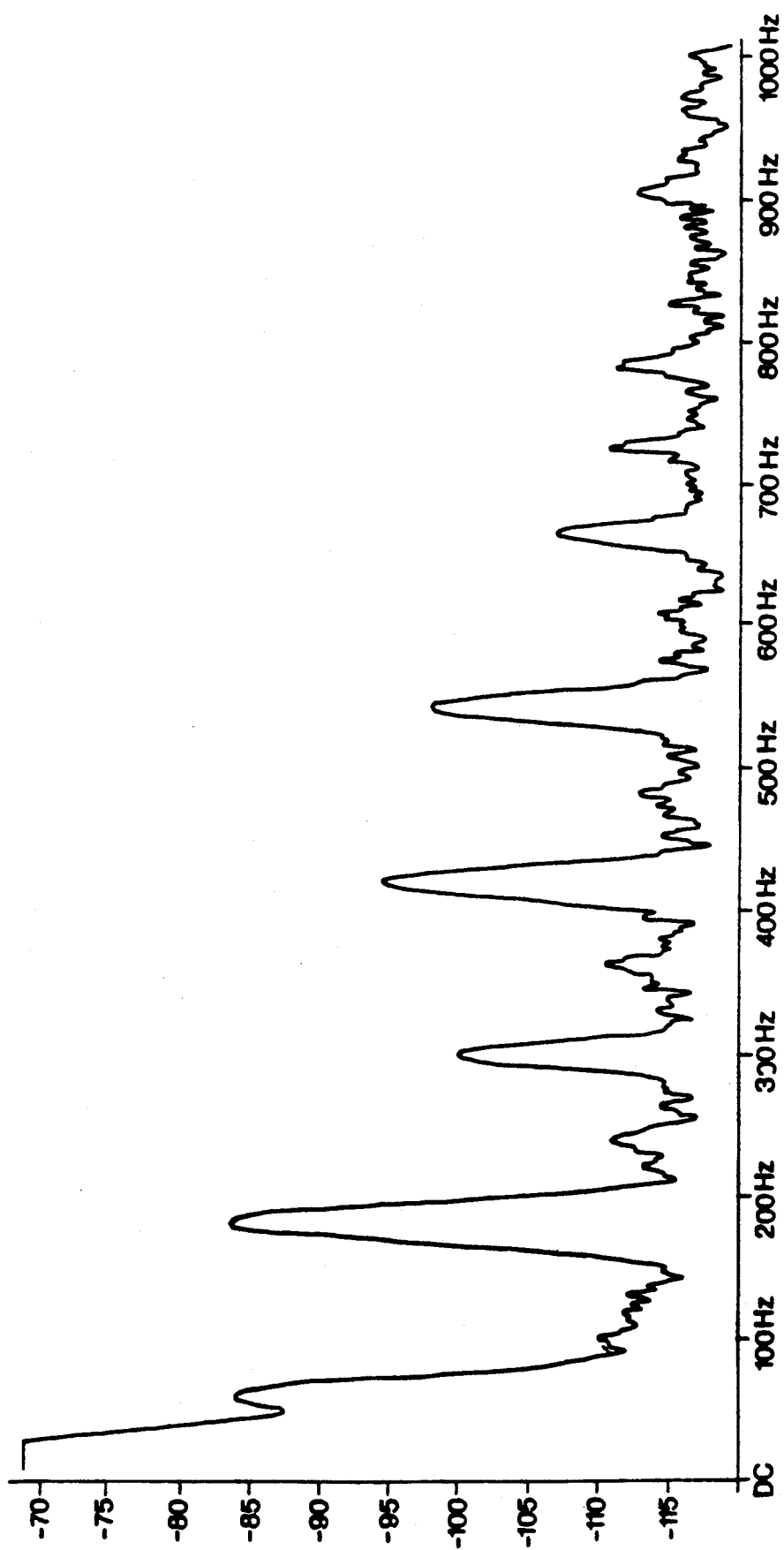

In the first embodiment of the present invention, the frequencies of the two signals are necessarily separated by at least a factor of two. This has the disadvantage, however, that the capacitive leakage current of the higher frequency is at least twice that of the lower frequency. This causes the two signals to experience a different rate of attenuation along the line. Hence, the range of operation of this first embodiment of the present invention is limited by the higher frequency. The higher that frequency, the greater the signal attenuation along the pipe or cable, and the shorter the range that signals can be traced. A further disadvantage of the first embodiment of the present invention is that, when the conductor to be detected is or is close to, a cable carrying mains power, or it could be interfered with by the discrete harmonics, as shown in FIGS. 4 and 5. It is necessary for the pass band of the receiver to avoid these frequencies, otherwise interference occurs. When the frequencies are spaced by a factor of at least 2, which is necessary in the first embodiment of the present invention, it becomes difficult to choose a pair of frequencies which both avoid lines in the interference power spectrum.

Therefore, according to a second embodiment of the present invention, the frequency relationship between the two signals is based on sub-harmonics. Then, assuming that the frequency of one signal is $F_1$, the frequency of the other signal is:

$$(F_1 + F_1/n) \text{ or } (F_1 - F_1/n)$$

In the receiver, these two frequencies are detected separately, and the frequency difference between them ($F_1/n$) is calculated. The phase of this signal is dependent on the difference in phase between the two original frequencies. By investigation of this phase difference, it is possible, as in the first embodiment, to determine the conductor to which the signal has actually been applied, because there will be phase reversal if what is detected is a signal transmitted by capacitive coupling to another line.

Figure 6:
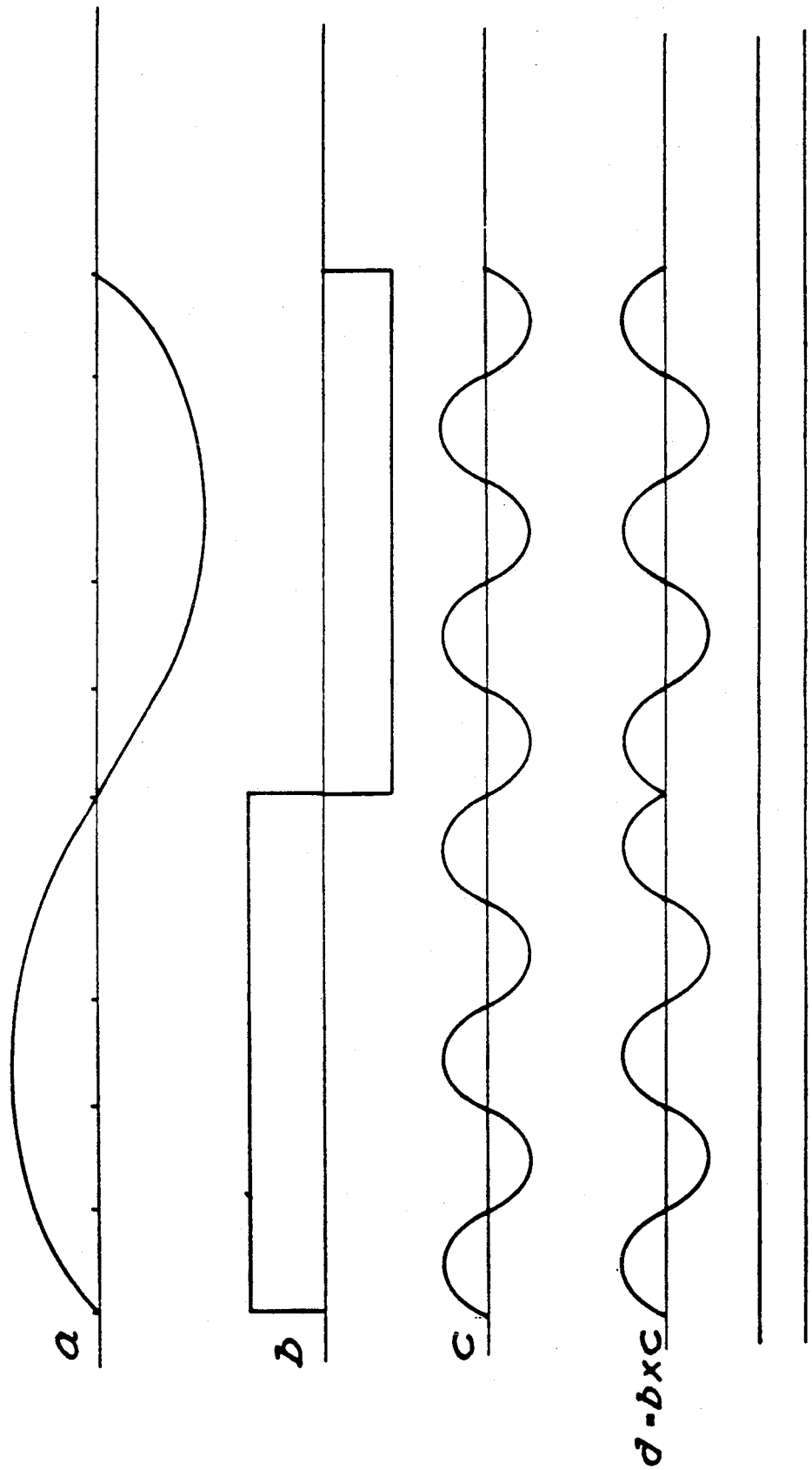
FIGS. 6 and 7 show processing signals involving odd and even sub-harmonics, respectively.

In the first embodiment of the present invention, the method of processing the two received signals is based on simple multiplication. However, in the second embodiment of the present invention, an alternative technique may be used. Again, however, this is based on the idea that if both frequencies change by 180°, as they would on a conductor to which the transmitted signal has been passed by capacitive coupling, the phase of the calculated signal (i.e. the signal at frequency $F_1/n$ derived above) is compared in phase with the original frequency $F_1$. If the integer n is odd, the calculated frequency $F_1/n$ is used as a reference to synchronously demodulate signal frequency $F_1$. This is shown in FIG. 6, in which the calculated signal at frequency $F_1/n$ is shown at (a), and this calculated signal is used to generate a synchronous multiplier signal shown at (b). By multiplying the original signal shown at (c) with the signal shown at (b), the signal shown at (d) is produced, which signal has a net dc voltage. It can be observed that when signal (c) changes phase by 180°, the signal at (a) remains unchanged, so giving a negative dc voltage.

Thus, by detection of the net dc voltage, it is possible to detect whether the conductor being investigated is one to which the original signal is applied directly, or to which that signal has been transmitted by capacitive coupling.

Figure 7:
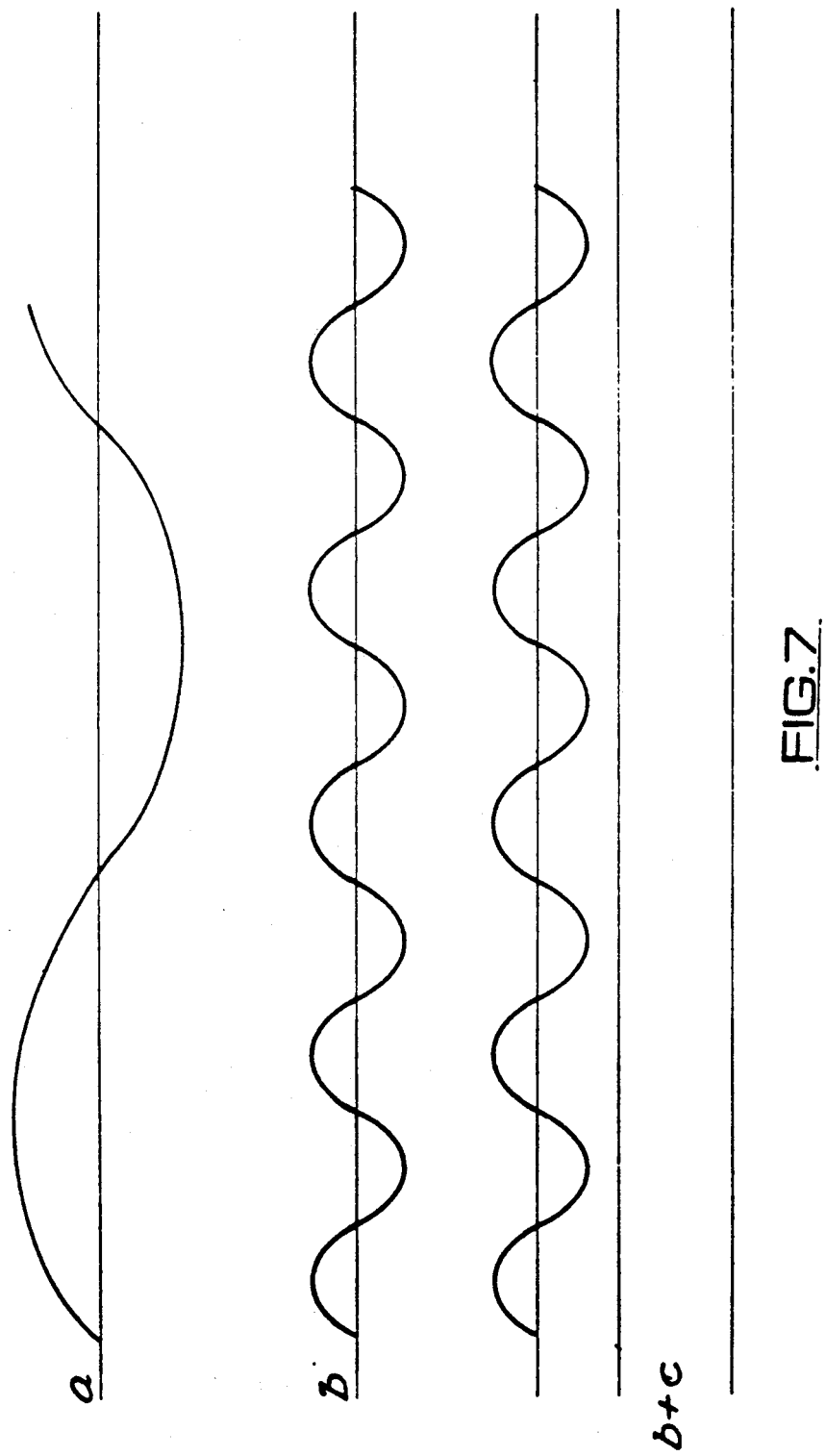

When the sub-harmonic number n is even, then a slightly different method of analysis is used. Again, the difference signal ($F_1/n$) is calculated, this being shown at (a) in FIG. 7. However, instead of immediately generating a synchronous multiplier, the calculated signal is multiplied by n (in this case 4), to produce the signal shown at (b). Then, the original frequency signal (shown at c) is synchronously demodulated using the signal shown at (b). This again results in the net dc voltage known at (d), and the sign of this dc voltage determines whether the conductor is one to which the original signal has been applied, or one to which that signal has been transmitted by capacitive coupling. This is because, when signal (c) changes phase by 180°, signal (a) remains unchanged (therefore signal (b) remains unchanged), so that the sign of the product will be different.

It should be noted that this method of processing can also be applied to the signals produced in the first embodiment of the present invention.

FIG. 8 shows a block diagram of a transmitter for use when the sub-harmonic number n is even. The output of an oscillator 20 is transmitted to two dividers 21 22, which produce a signal at $F_1$ and $F_1/n$ respectively. These are then transmitted to the line via a coupler 22, which produces the signals $F_1$ and $(F_1+F_1/n)$ or $(F_1-F_1/n)$. Where the sub-harmonic number n is odd, however, then the circuit shown in FIG. 9 is used, in which the output of an oscillator 30 is first divided by a divider 31 to produce a signal at frequency $F_1$, and then that signal is transmitted to a coupler 32 both directly and via a further divider 33, that further divider producing the sub-harmonic.

Figure 10:
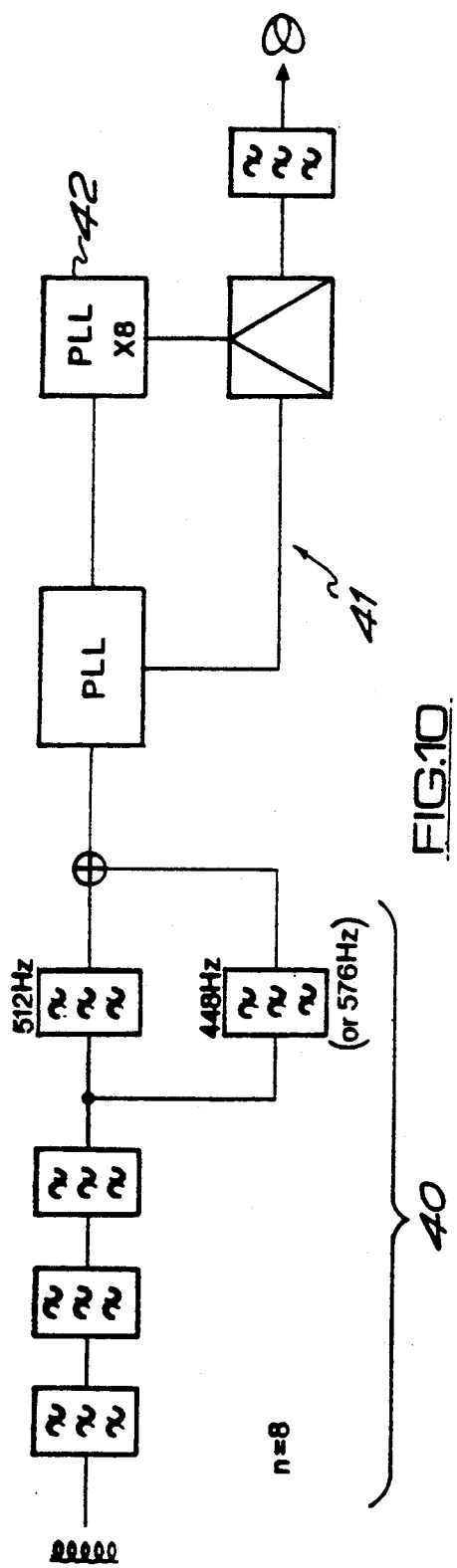
FIGS. 10 and 11 are block diagrams of receivers for arrangements involving even and odd sub-harmonics, respectively.
Figure 11:
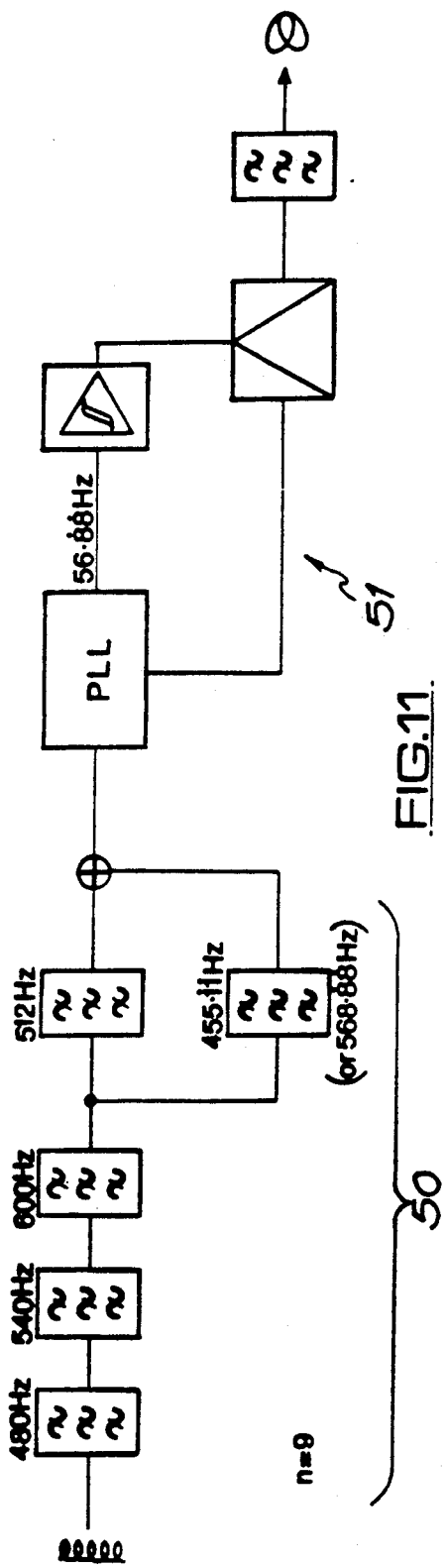

The receivers used in conjunction with the circuits shown in FIGS. 8 and 9 are shown in FIGS. 10 and 11 respectively. In each case, the circuit has a filtering arrangement 40, 50, which are adjusted to these signals on the line produced by the transmitters. If the output of those filters 40, 50, are in each case transmitted to a phase locked loop (PLL) 41, 51, the phase locked loop 41, 51 carries out the synchronous demodulation which was described with reference to FIGS. 6 and 7. Thus, when n is even, the circuit as shown in FIG. 10 is used in which the calculated signal $F_1/n$ is multiplied by a multiplier 42, which multiplier is not necessary in the phase-locked loop 51 in FIG. 11.

With this second embodiment of the present invention, the frequencies of the two signals are much closer together than in the first embodiment. It is therefore easier to choose those two frequencies to avoid lines in the interference power spectrum of the mains signal being transmitted on the cable.

In the above description, it is assumed that the signals are transmitted from the end point of the pipe or cable. However, this is not necessary, and it is possible to use a relative system in which a measurement is made at some point along the cable and the phase "zero" of the system set to that point. Then, by investigating spaced apart points along the cable or pipe, the change in phase can be determined in a similar way to that described above. This is useful where there is a phase charge applied to the signal by the line itself.

This principle, applied to pipe and cable surveying techniques provides additional useful information to the operator when resolving the route of a particular conductor in a congested area since with conventional locators, the response over each of the conductors could be identical; using the system of the present invention, two distinctly identifiable response are obtained.

We claim:

1. A method of tracing a conductor, comprising the following steps:
    applying an alternating signal to the conductor at a first point;
    detecting at a second point and at a third point the field produced by said alternating signal in said conductor;
    wherein said alternating signal alternates at substantially less than radio frequency and has first and second continuously present sinusoidal components related in frequency and phase whereby said field has first and second continuously present sinusoidal field components; and
    determining any change in phase difference in said first and second sinusoidal field components between said second and third points;
    wherein a determination of a predetermined phase relationship traces said conductor from said second point to said third point, while determination of a change in said phase relationship indicates that a different conductor is being traced from said second point.

2. A method according to claim 1, wherein said first and second points are the same.

3. A method according to claim 1, wherein said second and third points are remote from the first point.

4. A method according to any one of the preceding claims, wherein the frequency of said first sinusoidal component corresponds to the frequency of said second sinusoidal component multiplied by an integer.

5. A method according to claim 4, wherein said integer multiple is an even multiple.

6. A method according to claim 4, wherein said first and second sinusoidal signal components produce respectively said first and second sinusoidal field components, and said step of determining includes multiplying said second sinusoidal field component by said integer prior to said determination any change in phase difference.

7. A method according to any one of claims 1 to 3 wherein the frequency of said first of said components is determined by multiplying the frequency of the second of said components by a factor selected from the group consisting of $(1+1/n)$ and $(1-1/n)$ where n is an integer.

8. An apparatus for tracing a conductor, comprising:
    generation means for applying an alternating signal to the conductor at a first point; and
    detection means for detecting the field produced by said signal on said conductor;
    wherein said generation means applies an alternating signal alternating at substantially less than radio frequency having first and second continuously present sinusoidal components related in frequency and phase, thereby to generate a field having first and second continuously present sinusoidal field components; and said detection means detects said first and second sinusoidal field components produced by said signal at second and third points, and includes determination means for determining changes in phase difference of said first and second sinusoidal field components between said second and third points; wherein a determination of a predetermined phase relationship traces said conductor from said second point to said third point, while determination of a change in said phase relationship indicates that a different conductor is being traced from said second point.

9. An apparatus according to claim 8, wherein said generation means is arranged to generate said first component of said signal and to derive said second component of said signal therefrom by multiplication.

10. An apparatus according to claim 7 or claim 8 wherein said detection means is arranged to multiply the frequency of said second component of said field by a predetermined multiple prior to said determining of changes of phase by said determination means.

* * * * *